Figure 1:
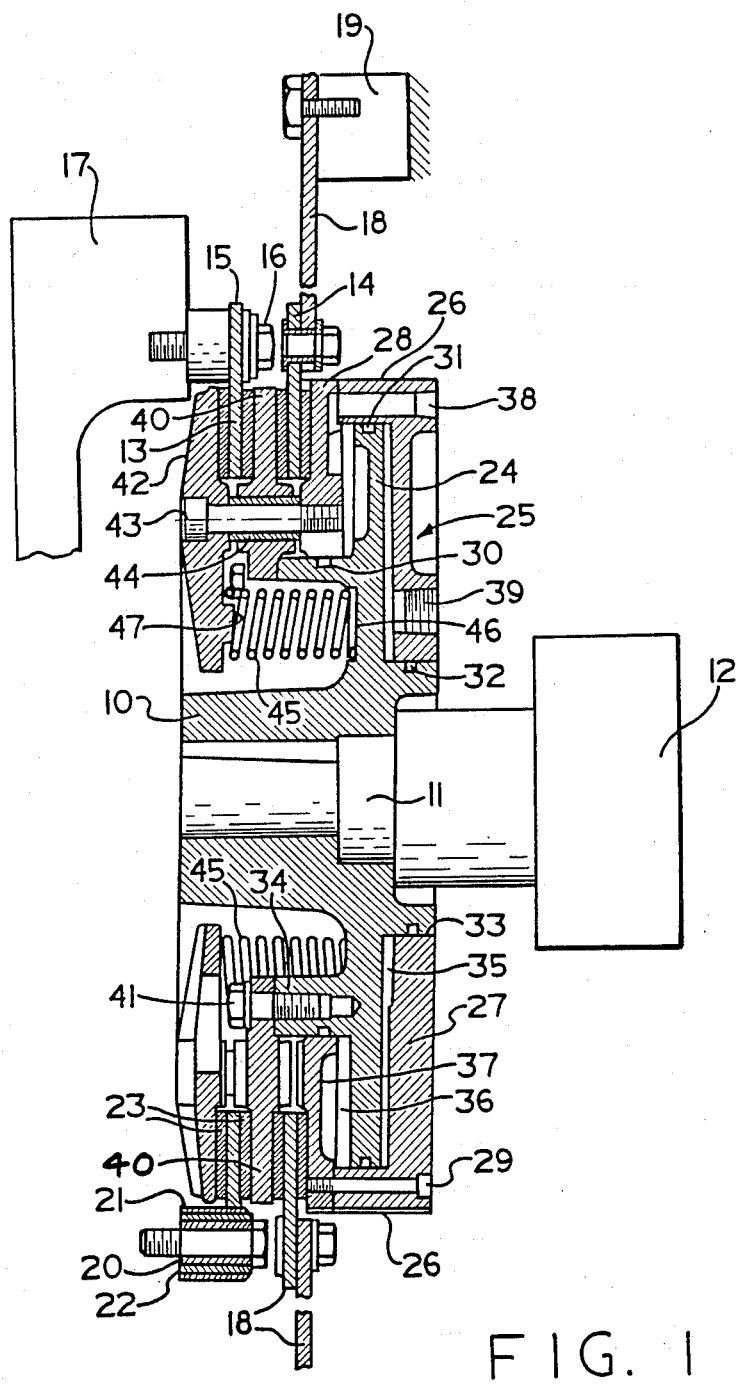

United States Patent [19]

Collins

[11] Patent Number: 4,807,731

[45] Date of Patent: Feb. 28, 1989

[54] CLUTCH AND BRAKE ASSEMBLY

[75] Inventor: Marcus H. Collins, Akron, Ohio

[73] Assignee: Eaton Corporation, Cleveland, Ohio

[21] Appl. No.: 95,195

[22] Filed: Sep. 11, 1987

[51] Int. Cl.$^4$ ............................................. F16D 67/04
[52] U.S. Cl. .................................... 192/18 A; 192/14;
192/12 C
[58] Field of Search ...................... 192/18 A, 14, 12 C

[56]  References Cited

U.S. PATENT DOCUMENTS

| | | | |
|---|---|---|---|
| 2,998,872 | 9/1961 | Sommer et al. | 192/18 A |
| 3,469,664 | 9/1969 | Ortlinghaus et al. | 192/181 X |
| 3,727,731 | 4/1973 | Selig | 192/18 A |

FOREIGN PATENT DOCUMENTS

| | | | |
|---|---|---|---|
| 759772 | 8/1980 | U.S.S.R. | 192/18 A |
| 1009230 | 11/1965 | United Kingdom | 192/18 A |
| 1602850 | 11/1981 | United Kingdom | 192/18 A |

Primary Examiner—Leslie A. Braun
Assistant Examiner—David A. Testardi
Attorney, Agent, or Firm—C. J. Toddy

[57] ABSTRACT

A clutch and brake assembly for alternately coupling a machine input shaft to a clutch disc or a brake disc for applying a driving torque or a braking torque to the input shaft. An axially movable cylinder is connected to a brake plate and a clutch plate. An annular piston is carried by a hub fixed to the input shaft and is connected to a rotor spaced at an axially fixed distance from the piston. The brake disc is positioned between the brake plate and the rotor while the clutch disc is positioned between the clutch plate and the rotor. A spring force normally urges the brake disc into engagement with the rotor. A pressure chamber is formed between the piston and cylinder and a passage is provided for admitting pressurized fluid to the chamber, thereby overcoming the spring force to urge the clutch disc into engagement with the rotor.

12 Claims, 2 Drawing Sheets

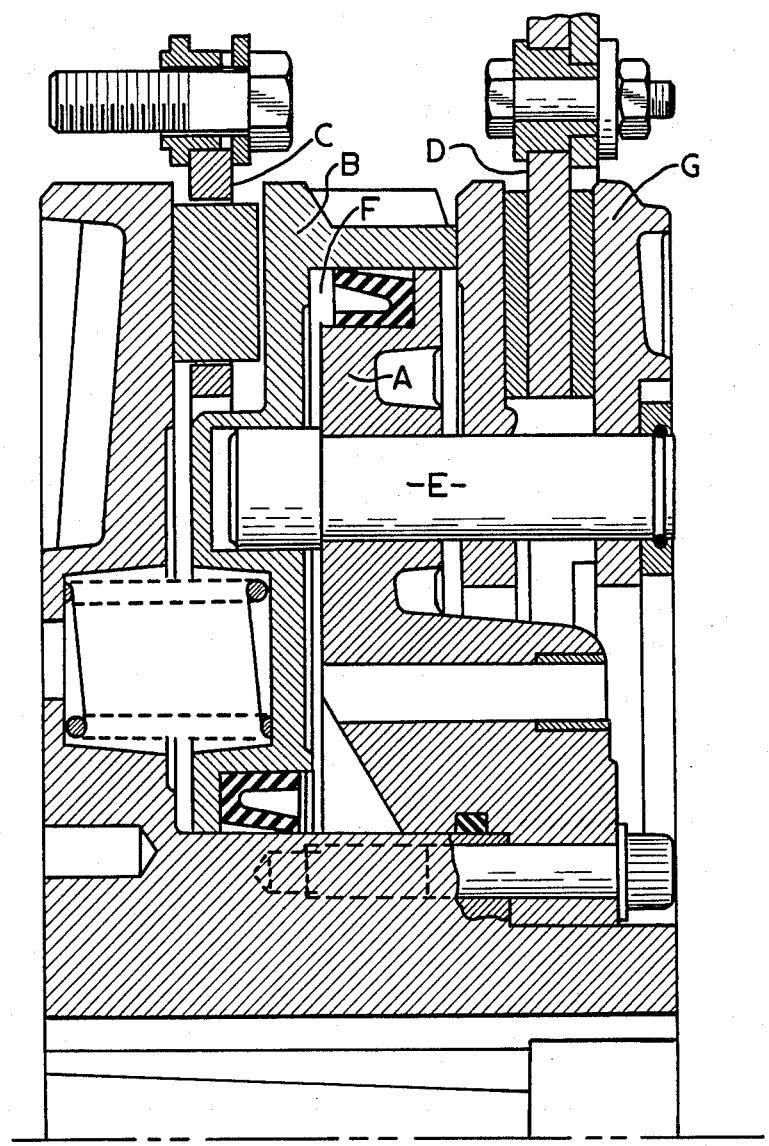
PRIOR ART FIG. 2

CLUTCH AND BRAKE ASSEMBLY

This invention relates to a clutch and brake assembly for alternately coupling a machine input shaft to a clutch disc or brake disc to apply driving torque and braking torque to the input shaft of the machine. The machine may be a press, a can forming machine, or the like, in which the input shaft is driven by an air actuating clutch and braked by a spring applied brake.

U.S. Pat. Nos. 3,469,664 and 3,727,731 disclose clutch and brake assembly of the above type in which an axially moveable pressure plate or rotor is mounted between a clutch disc and a brake disc and is moved axially into engagement with the clutch and brake discs. The axially moveable pressure plate is secured to or abuts a piston which when pressurized moves axially and thus moves the pressure plate into engagement with the clutch disc. A plurality of bolts or pins fixed to the hub pass through holes in the pressure plate to support and guide the axially moveable pressure plate.

Clutch and brake assemblies similar to the above patents are also known as shown in FIG. 2. The piston A is fixed and a coacting cylinder B is moved axially into engagement with the clutch disc C and brake disc D. The piston A and cylinder B are positioned between the clutch and brake discs. A series of pins E passing through the piston and pressure chamber F supports the cylinder B at one end and the brake plates G at the other end.

Clutch and brake assemblies of the above prior art operate satisfactorily at or below a machine duty cycle of approximately 250 cycles per minute. However, presses, and particularly can forming machines, are now required to operate as high as 300 to 400 cycles per minute. It is found that the clutch and brake assemblies of the above prior art do not have the necessary durability and prematurely fail when operating a duty cycle higher than approximately 250. It is believed that this premature failure at higher operating cycles is caused by the cantilever mounting of the pressure plate and brake plate and the axial movement of the pressure plates relative to the clutch and brake discs.

It is an object of this invention to increase the durability of clutch and brake assemblies of the prior art at high machine cycle times by providing a clutch and brake assembly having a rotor which is fixed axially relative to and supports the axially movable clutch and brake discs and which provides a better distribution of stresses in the assembly during increased machine duty cycle or faster cycling time.

Another object of the invention is to provide a clutch and brake assembly of the above type in which the rotor is fixed to a stationary piston, and is of compact construction and increased durability at fast machine cycle times.

The invention is diametrically illustrated in the accompanying drawings, in which FIG. 1 is a longitudinal sectional view showing the combined clutch and brake apparatus according to this invention.

FIG. 2 is a longitudinal sectional view of a prior art clutch and brake.

The clutch and brake assembly of this invention comprises a hub 10 which is keyed, or otherwise fixed, to the input shaft 11 of a machine 12, typically, a can forming press, punching machine or the like operating at high speed or duty cycles. The assembly is subjected to torque reversals via the shaft 11 up to several hundred cycles per minute.

The clutch disc extentions 15 are secured by bolts 16 to a driving member 17 which is a flywheel in typical applications. The brake disc reaction arms 18 are connected to the frame 19 of the machine. Preferably, the bolts 16 have an inner and outer bushing 20 and 21 with an intermediate rubber bushing 22 which cushions or absorbs vibrations and noise. The clutch and brake discs may move axially a limited distance since a small clearness exists between the outer bushing 21 and the holes in the extentions 15 and arms 18. Both faces of each of the discs 13 and 14 have a disc 23 made of friction material which is riveted or otherwise secured to the faces of the discs 13 and 14.

The hub 10 is provided with an integrally formed fixed piston 24 extending radially from the hub which coacts with an annular axially moveable cylinder, generally referred to by the numeral 25. The cylinder 25 is formed by an outer cylindrical portion, 26, an annular radially extending portion 27 and an annular brake plate 28. Portion 26 is secured to the brake plate 28 by a plurality of bolts 29 extending through the portion 26. The piston 24 is provided with three annular seals 30, 31 and 32. The seals 30 and 32 respectively seals the I.D. of the brake plate 28 and the portion 27 of the cylinder 25 and the O.D. of the axially extending annular piston flanges 33 and 34. The seal 31 seals the I.D. of the cylinder portion 26 and the O.D. of the piston 24. Thus, a pressure chamber 35 is formed by the cylinder portion 27 and the piston 24. Another pressure chamber 36 is formed by the wall 37 of the brake plate 28 and the other side of the piston 24. Passageways 38 and 39 are provided in the portions 26 and 27 of the cylinder, each connected to a source of pressurized fluid and a fluid circuit (not shown) for pressurizing alternately the chambers 35 and 36 by connecting passageway 38 to exhaust when passageway 39 is pressurized and visa versa. A rotor 40 which may be ventilated is fixed to the piston flange 34 by a plurality of bolts 41 extending through holes in the radial inner portion so that the rotor 40 is spaced from brake plate 28 and is interposed between the clutch disc 15 and the brake disc 14. Since between piston 24 is fixed to the hub and the rotor 40 is fixed to the piston, the rotor 40, piston 24, and hub 10 rotate together as a unit but do not move axially.

An annular clutch plate 42 is secured to the brake plate 28 by bolts 43 extending through spacer tubes 44 which spaces the clutch plate, a predetermined distance from the brake plate 28 for engagement with the clutch disc 15. The clutch plate 42, brake plate 28 and the cylinder 25, move axially as a unit. A plurality of coil springs 45 are mounted between the clutch plate 42 and the piston 24. One end of each spring 45 is positioned in a depression 46 in the piston and the other end is positioned over a circular projection 47 formed on the face of the clutch plate to hold the springs in position.

The clutch and brake assembly operates to couple the machine shaft 11 to the driving member 17 when fluid pressure in the chamber 35 exceeds the pressure of the springs 45 and urges the clutch plate 42 to the right, as viewed in the drawing, toward the clutch disc to engage the friction discs 23, secured to the clutch disc, with the clutch plate 42 and the rotor 40. At the same time, the brake plate 28 moves to the right and is disengaged from the friction disc secured to the brake disc 14. The assembly acts in its braking mode when chamber 35 is depressurized. At the same time that chamber 35 is being depressurized, the chamber 36 is being pressurized which provides additional braking torque and causes the chamber 35 to be exhausted or depressurized faster than if the chamber 35 was depressurized only by the biasing forces of the springs 45 urging the cylinder portion 27 toward the piston 24.

I claim:

1. A spring operated brake and fluid operated clutch apparatus comprising, a hub fixed to and rotatable with a driven shaft;

an annular piston means extending radially from said hub and fixed to and rotatable with said hub;

a rotor and means mounting said rotor to said piston means at an axially displaced fixed distance from said piston means;

an axially moveable cylinder means extending radially and forming an annular pressure chamber with said piston means and having a brake plate positioned at one side of said rotor;

an axially moveable annular clutch plate and means for rigidly connecting said clutch plate to and axially spaced from said brake plate, said clutch plate positioned on the opposite side of said rotor;

a drivable rotatable clutch disc and a non-rotatable brake disc, said rotor disposed between said clutch disc and brake disc;

annular friction means disposed on opposite faces of said clutch disc and brake disc;

means attached to the outer periphery of said clutch disc connecting said clutch disc to a rotatable driving member;

means attached to the outer periphery of said brake disc connecting said brake disc to a fixed part;

spring means biasing said brake disc toward said rotor, thereby applying a braking torque to the driven shaft; and passage means for admitting pressure fluid to said pressure chamber whereby the biasing forces are removed from said brake disc and said clutch plate is moved axially toward said clutch disc connecting the driving member to the driven shaft.

2. A clutch apparatus as claimed in claim 1 in which said cylinder means and said piston means are positioned axially from and on one side of said brake disc, said cylinder and piston means having an outer diameter greater than the internal diameter of said brake disk.

3. A clutch apparatus as claimed in claim 1 in which said axially moveable cylinder means includes a cylindrical part and first and second annular parts extending radially inwardly from said cylindrical part, said fixed annular piston means being positioned between said annular parts.

4. A clutch apparatus as claimed in claim 3 in which said first and second annular parts form a pressure chamber on each side of said piston and means for supplying fluid pressure to one chamber as fluid pressure is exhausted from the other chamber.

5. A clutch apparatus as claimed in claim 1 in which said rotor mounting means includes means projecting axially from said piston means and means attaching said rotor to said projecting means.

6. A clutch apparatus as claimed in claim 5 in which said projecting means includes a cylindrical surface on which said brake plate is slidably supported.

7. A clutch apparatus as claimed in claim 5 in which said spring means are positioned substantially radially inwardly of said projecting means.

8. A clutch apparatus as claimed in claim 1 in which said rotor includes axially extending slide holes, and said means for connecting said clutch and brake plates in axially spaced relationship includes means extending through said slide holes.

9. A clutch apparatus as claimed in claim 8 in which said means are bolts.

10. A clutch apparatus as claimed in claim 8 in which said rotor slide holes and said connecting means are located radially outwardly of said rotor mounting means.

11. A clutch apparatus as claimed in claim 8 in which connecting means includes spacer means for spacing said clutch and brake means a predetermined distance apart.

12. A clutch apparatus as claimed in claim 11 in which said spacer means are tubular members.

* * * * *